US012795793B2

(12) United States Patent
Kelly et al.

(10) Patent No.: US 12,795,793 B2
(45) Date of Patent: Nov. 10, 2026

(54) INTERACTIVE SYSTEMS AND METHODS FOR COLLECTING COLORS ON AN INTERACTIVE DEVICE

(71) Applicant: LIGHTUPTOYS.COM, LLC, Sellersburg, IN (US)

(72) Inventors: Joshua C. Kelly, New Albany, IN (US); Christopher D. Kelly, New Albany, IN (US); Max Armendariz Lalama, Sellersburg, IN (US); Renata T. Kelly, New Albany, IN (US); Christopher W. Chung, Orlando, FL (US)

(73) Assignee: LightUpToys.com LLC, Sellersburg, IN (US)

( * ) Notice: Subject to any disclaimer, the term of this patent is extended or adjusted under 35 U.S.C. 154(b) by 167 days.

(21) Appl. No.: 18/941,812

(22) Filed: Nov. 8, 2024

(65) Prior Publication Data

US 2025/0159772 A1 May 15, 2025

Related U.S. Application Data

(60) Provisional application No. 63/597,386, filed on Nov. 9, 2023.

(51) Int. Cl.

*H05B 45/20* (2020.01)
*A63H 33/26* (2006.01)
*A63H 33/28* (2006.01)

(52) U.S. Cl.

CPC ............. *H05B 45/20* (2020.01); *A63H 33/26* (2013.01); *A63H 33/28* (2013.01); *A63H 2200/00* (2013.01)

(58) Field of Classification Search

None

See application file for complete search history.

(56) References Cited

U.S. PATENT DOCUMENTS

| | | | | |
|---|---|---|---|---|
| 6,022,273 | A | 2/2000 | Gabai et al. | |
| 9,474,962 | B2 * | 10/2016 | Barney | A63F 13/235 |
| 10,674,588 | B2 | 6/2020 | Kelly et al. | |
| 10,738,972 | B1 | 8/2020 | Kelly et al. | |
| 10,916,059 | B2 | 2/2021 | Cossairt et al. | |
| 11,149,932 | B1 | 10/2021 | Kelly et al. | |
| 11,274,707 | B2 | 3/2022 | Kelly et al. | |
| 11,379,678 | B2 | 7/2022 | Yeh et al. | |

(Continued)

*Primary Examiner* — Stephen T. Reed

(74) *Attorney, Agent, or Firm* — Jessica C. Ronald; Scott R. Cox

(57) ABSTRACT

Interactive systems and methods for collecting colors on an interactive device including programming an integrated circuit secured within the interactive device to associate a unique code with a color, transmitting a unique signal associated with the unique code to a fixture, recognizing the unique signal within fixture, thereby illuminating the fixture in the color associated with the unique code and triggering the transmission of the unique signal from the fixture to the device. The unique signal is recognized by the integrated circuit of the device and triggers the illumination of an LED secured within the device in the color associated with the unique signal. One the device has collected the number of colors within that area of gameplay, a unique effect is unlocked from within the device and/or the device unlocks the next level of gameplay.

20 Claims, 15 Drawing Sheets

(56) References Cited

U.S. PATENT DOCUMENTS

| | | | |
|---|---|---|---|
| 11,918,931 | B2 | 3/2024 | Kelly et al. |
| 11,925,878 | B2 | 3/2024 | Kelly et al. |
| 12,097,447 | B2 | 9/2024 | Kelly et al. |
| 2014/0141688 | A1 | 5/2014 | Kelly et al. |
| 2014/0364032 | A1 | 12/2014 | Kelly et al. |
| 2016/0018083 | A1 | 1/2016 | Kelly et al. |
| 2016/0074759 | A1 | 3/2016 | Kelly et al. |
| 2016/0377271 | A1 | 12/2016 | Kelly et al. |
| 2019/0111358 | A1 | 4/2019 | Kelly et al. |
| 2019/0192989 | A1 | 6/2019 | Kelly et al. |
| 2022/0049842 | A1 | 2/2022 | Kelly et al. |
| 2023/0111031 | A1 | 4/2023 | Kelly et al. |
| 2023/0277953 | A1 | 9/2023 | Kelly et al. |
| 2023/0277954 | A1 | 9/2023 | Kelly et al. |
| 2024/0058715 | A1* | 2/2024 | Kelly ..................... A63H 27/10 |
| 2024/0066424 | A1 | 2/2024 | Kelly et al. |
| 2024/0149226 | A1 | 5/2024 | Kelly et al. |

* cited by examiner

INTERACTIVE SYSTEMS AND METHODS FOR COLLECTING COLORS ON AN INTERACTIVE DEVICE

CROSS-REFERENCE TO RELATED APPLICATIONS

This application claims benefit of provisional application No. 63/597,386 filed on Nov. 9, 2023. All publications, patents and patent applications referred to herein are incorporated by reference in their entirety.

FIELD OF INVENTION

The present disclosure relates generally to interactive systems and methods for collecting colors on an interactive device by receiving and transmitting unique signals. More specifically, the device contains light emitting diodes, which illuminate in a color that is associated with each unique signal that is received and/or transmitted.

BACKGROUND OF THE INVENTION

Amusement parks and/or theme parks include various entertainment attractions, most of which now include immersive or interactive experiences. For example, guests visit specific areas, which have various effects and features, such as audio and visual effects, bubble production, and/or light shows. With the increasing sophistication and complexity of modern immersive and interactive experiences, there is a need for guests to track the experiences that they have visited, and visually display said accomplishments all on one device, especially when participating in a gameplay. Not only does the visualization signify to others how many experiences they have visited, but it also allows the guest to track their points, so they know which area to visit next. Furthermore, guests should be rewarded when they visit a certain number of experiences and interactive experiences within a gameplay. For example, the guests should be able to utilize the device as a digital passport to unlock other experiences within the amusement park and/or display a unique effect or show when they have visited all related experiences. While bubble toys and bubble swords exist, none of these prior devices act both as a toy and a scoreboard for the user to visually track where they are within the gameplay. Moreover, these known devices cannot recognize when a user has collected a certain number of points within a gameplay to unlock other unique experiences within the park. Furthermore, these devices do not unlock a unique effect or show within themselves or a nearby fixture once a user has collected all points for a specific experience.

SUMMARY OF THE INVENTION

A method of collecting colors on an interactive device includes programming an integrated circuit secured within the interactive device to associate a unique code with a color, transmitting a unique signal associated with the unique code to a fixture, recognizing the unique signal within fixture, thereby illuminating the fixture in the color associated with the unique code and triggering the transmission of the unique signal from the fixture to the device, and recognizing the unique signal via the integrated circuit of the device, which triggers the illumination of an LED secured within the device in the color associated with the unique signal.

An interactive device for collecting colors including a housing with a first and second end, wherein the housing comprises a main printed circuit board with an integrated circuit, a receiver, and a transmitter, wherein the integrated circuit is configured to recognize at least one unique code, wherein each of the at least one unique code is associated with a color, a blade connected to the second end of the housing, wherein the blade comprises a first printed circuit board comprising at least one LED, wherein the at least one LED illuminates in the color associated with the at least one unique code and a handle secured to the first end of the housing and containing a button, which is configured to transmit a signal to a nearby device via the transmitter.

DETAILED DESCRIPTION

Figure 10:
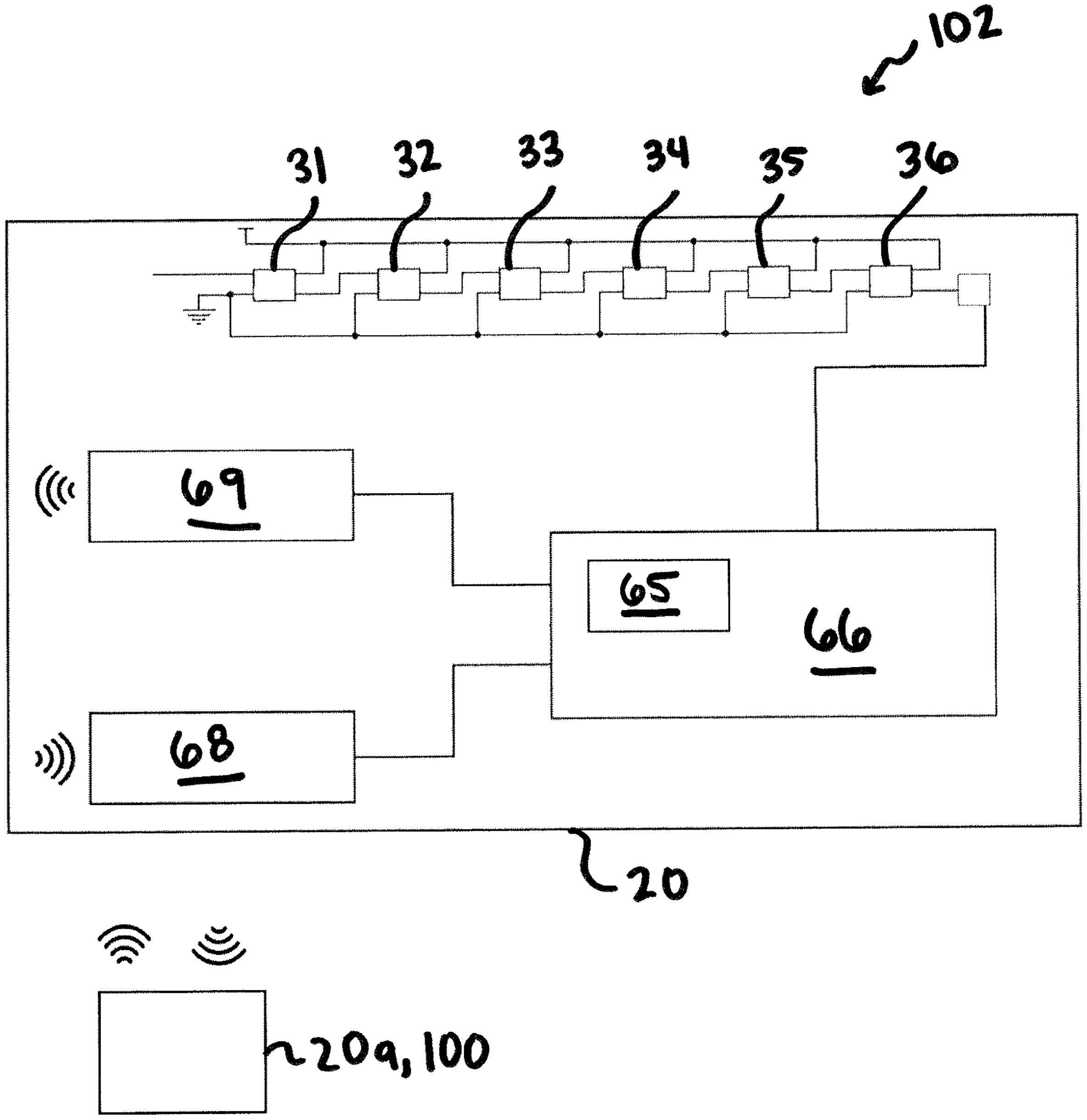
FIG. 10 is a schematic diagram of an interactive system for collecting colors utilized by the interactive device shown in FIG. 1.
Figure 11:
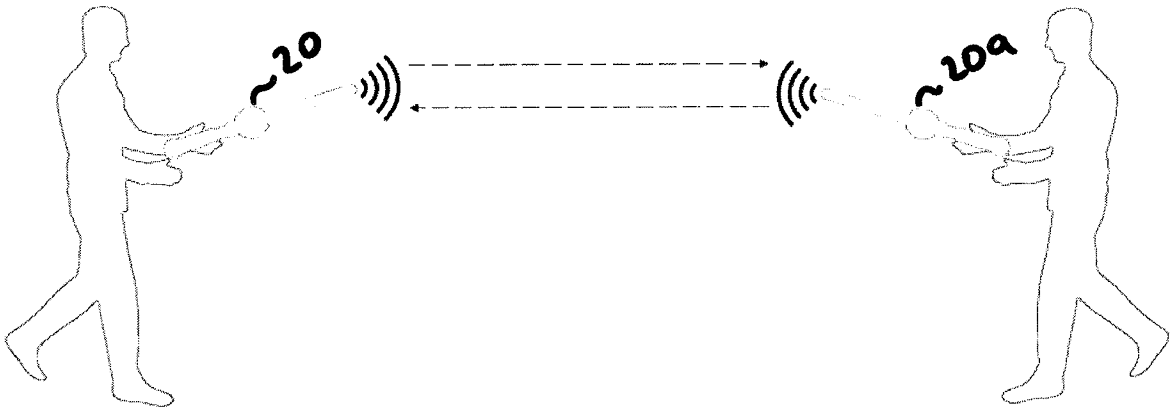
FIG. 11 is an illustration of one method of collecting colors between two interactive devices as shown in FIG. 1.
Figure 12:
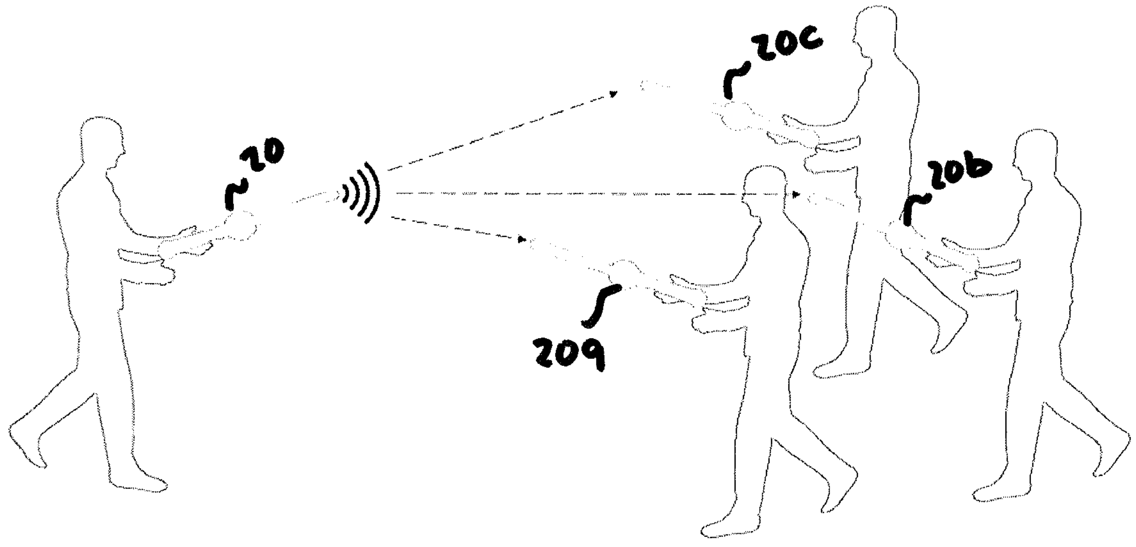
FIG. 12 is an illustration of a method of collecting colors between multiple interactive devices as shown in FIG. 1.
Figure 13:
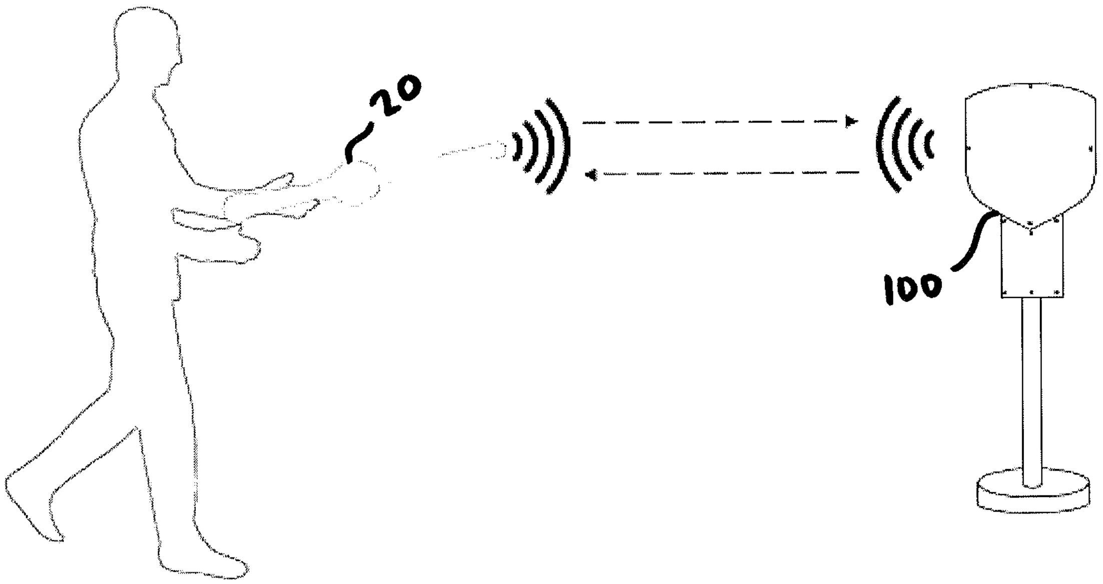
FIG. 13 is an illustration of a method of collecting colors between the interactive device as shown in FIG. 1 and a fixture.
Figure 14:
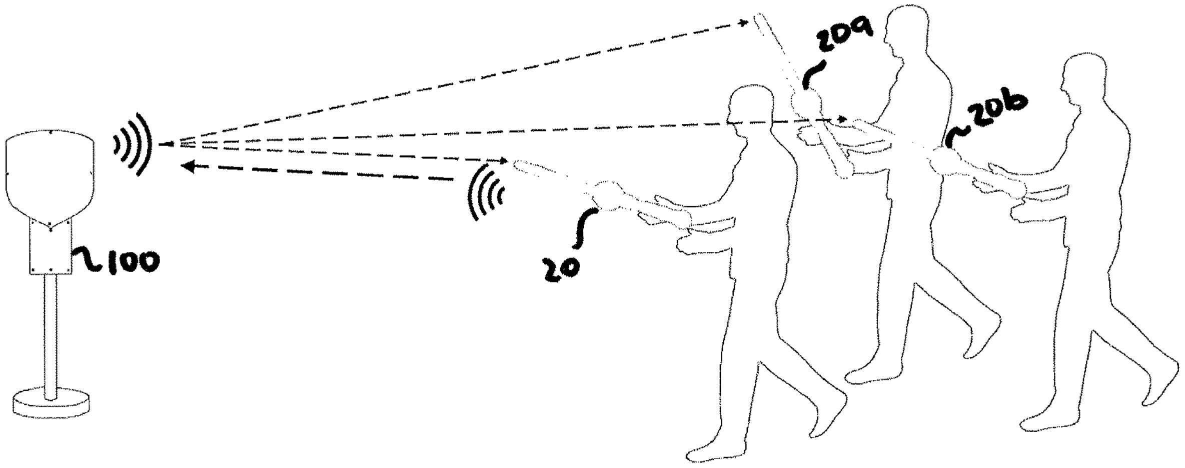
FIG. 14 is an illustration of another method of collecting colors between multiple interactives devices as shown in FIG. 1 and a fixture.
Figure 15:
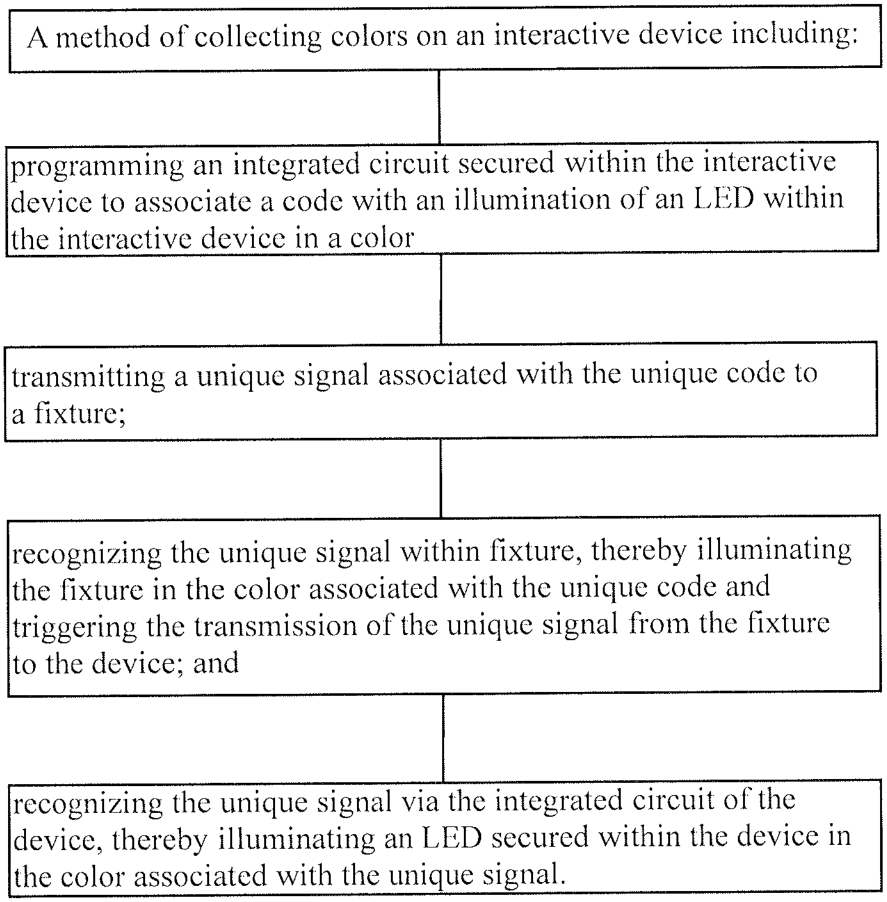
FIG. 15 is a flow diagram of the method of collecting colors between an interactive device and a fixture as shown in the illustration in FIG. 14.

FIGS. 1-9 show various views of an interactive device 20 that collects colors when receiving and/or transmitting a unique signal. FIG. 10 shows an interactive system 102 that is utilized by the interactive device to collect colors between itself and another device 20*a* and/or a fixture 100. FIGS. 11-12 shows various illustrations and methods of collecting colors between one or more interactive devices utilizing the system shown in FIG. 10. FIGS. 13-15 shows various illustrations and methods of collecting colors between one or multiple interactive devices and a nearby fixture utilizing the system shown in FIG. 10. The interactive device shown in the embodiment in FIGS. 1-9 and 11-15 is an interactive bubble sword, however, this should not be construed as limiting. The bubble sword embodiment of the interactive device is advantageous as it programmed to include various modes, so it is a toy that illuminates and/or creates bubbles and/or plays sound and is also a digital scoreboard that collects colors through the illumination of LEDs within its blade to signify where a user is and/or what level a user is on within a gameplay. Furthermore, when all the colors within a specific level of gameplay have been collected, the sword displays a unique feature as a reward and/or unlocks a key that allows the user access to a secret area of the park.

Figure 1:
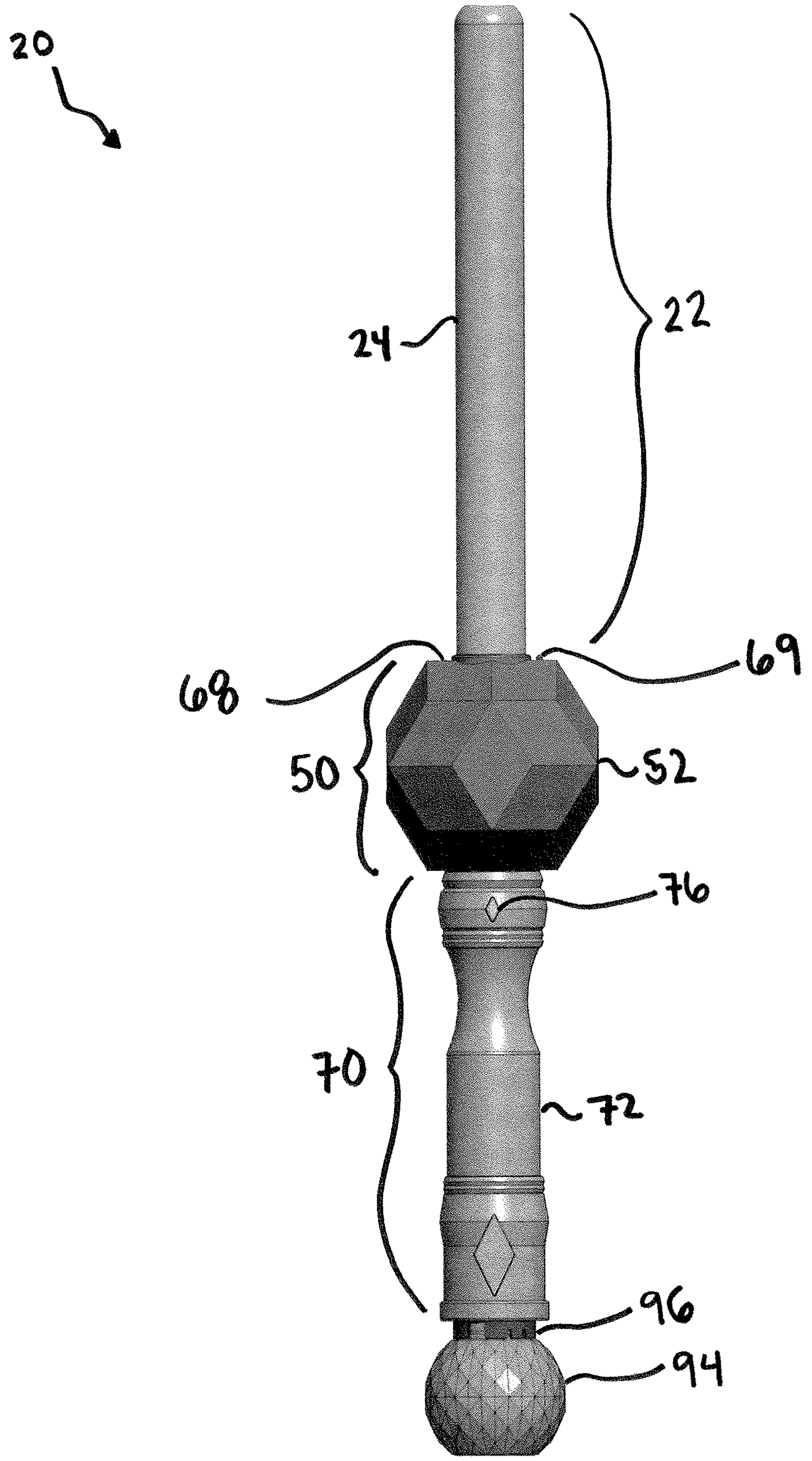
FIG. 1 is a front view of one embodiment of an interactive device for collecting colors.
Figure 2:
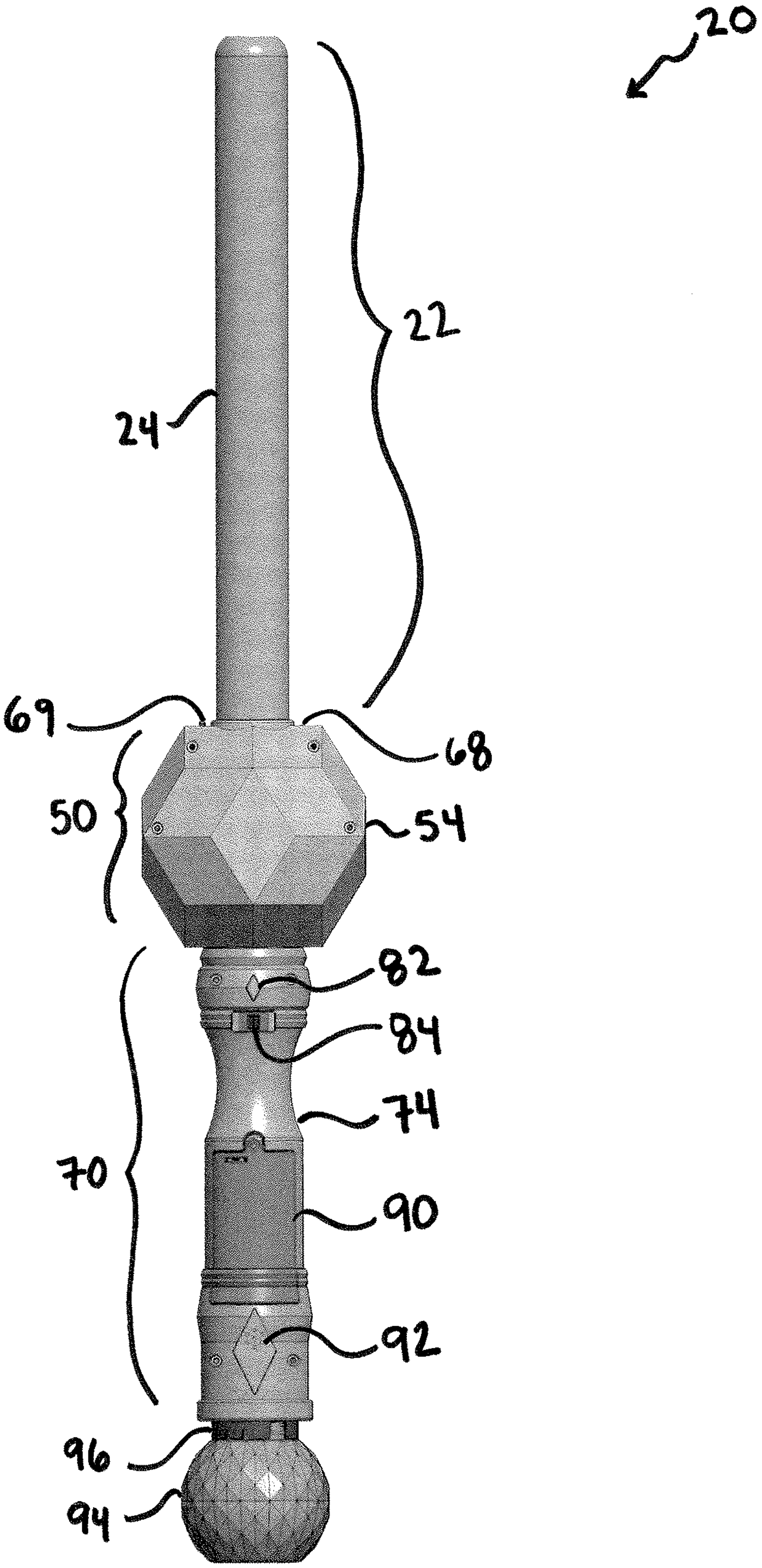
FIG. 2 is a back view of the interactive device for collecting colors shown in FIG. 1.
Figure 3:
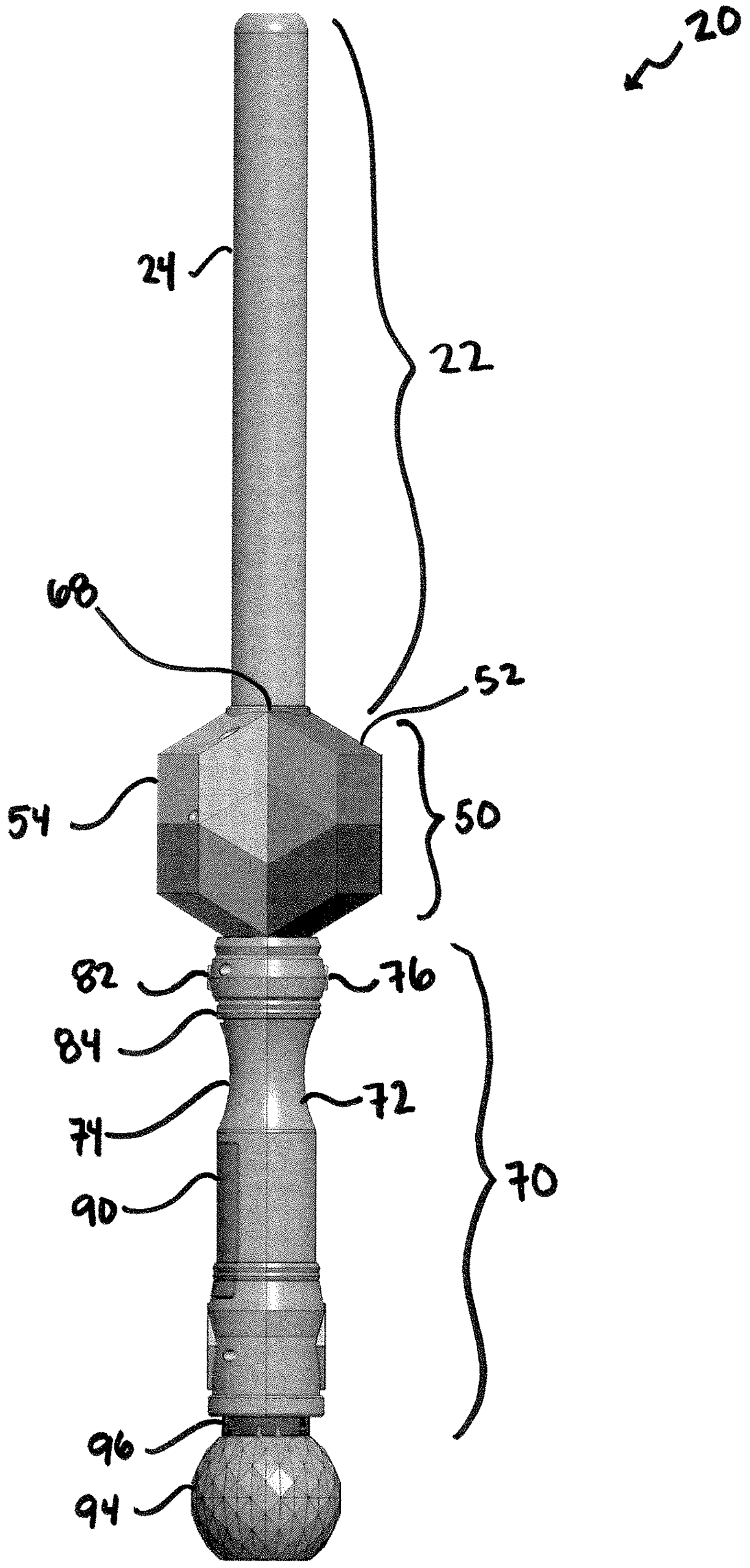
FIG. 3 is a right side view of the interactive device for collecting colors shown in FIG. 1.
Figure 4:
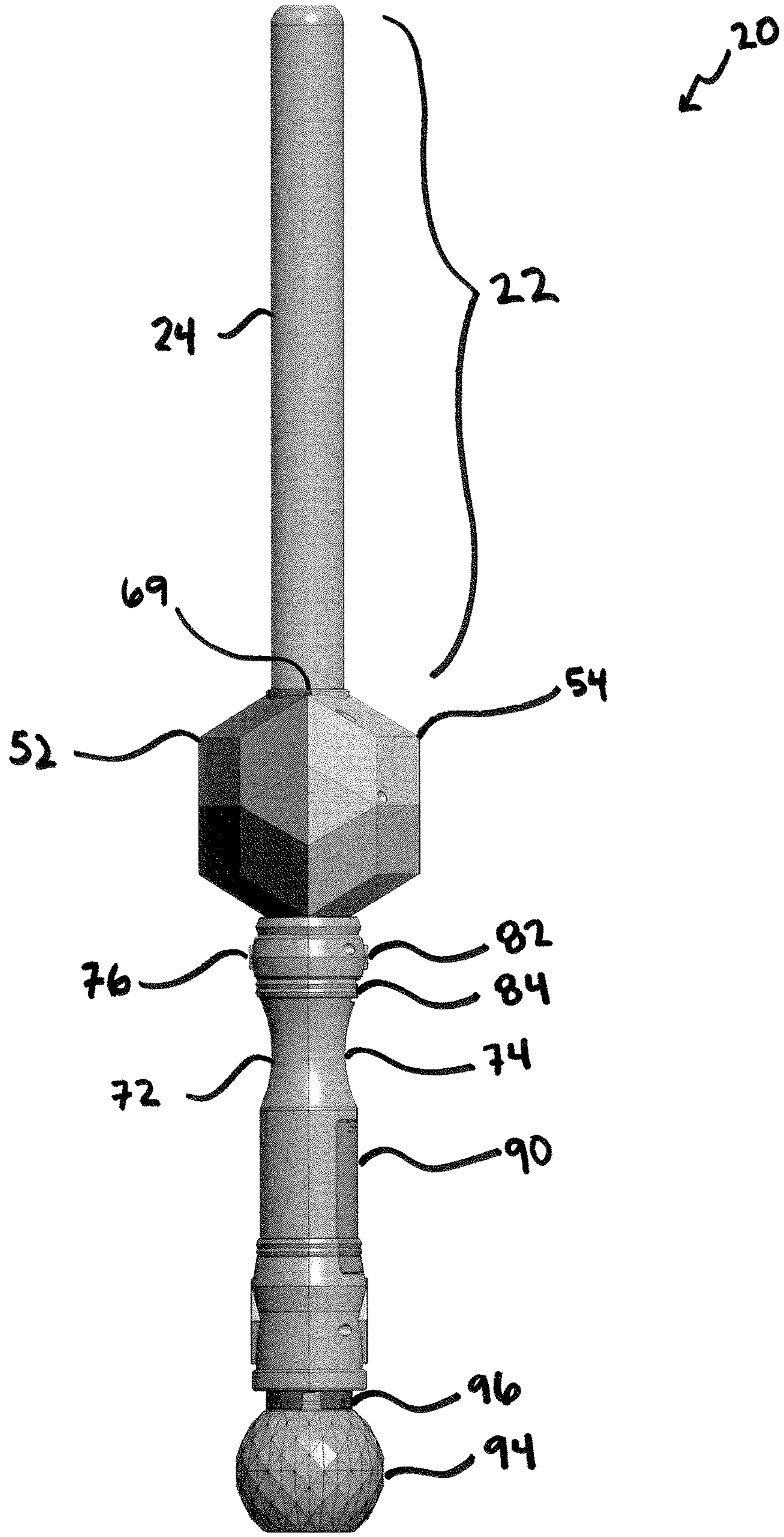
FIG. 4 is a left side view of the interactive device for collecting colors shown in FIG. 1.
Figure 5:
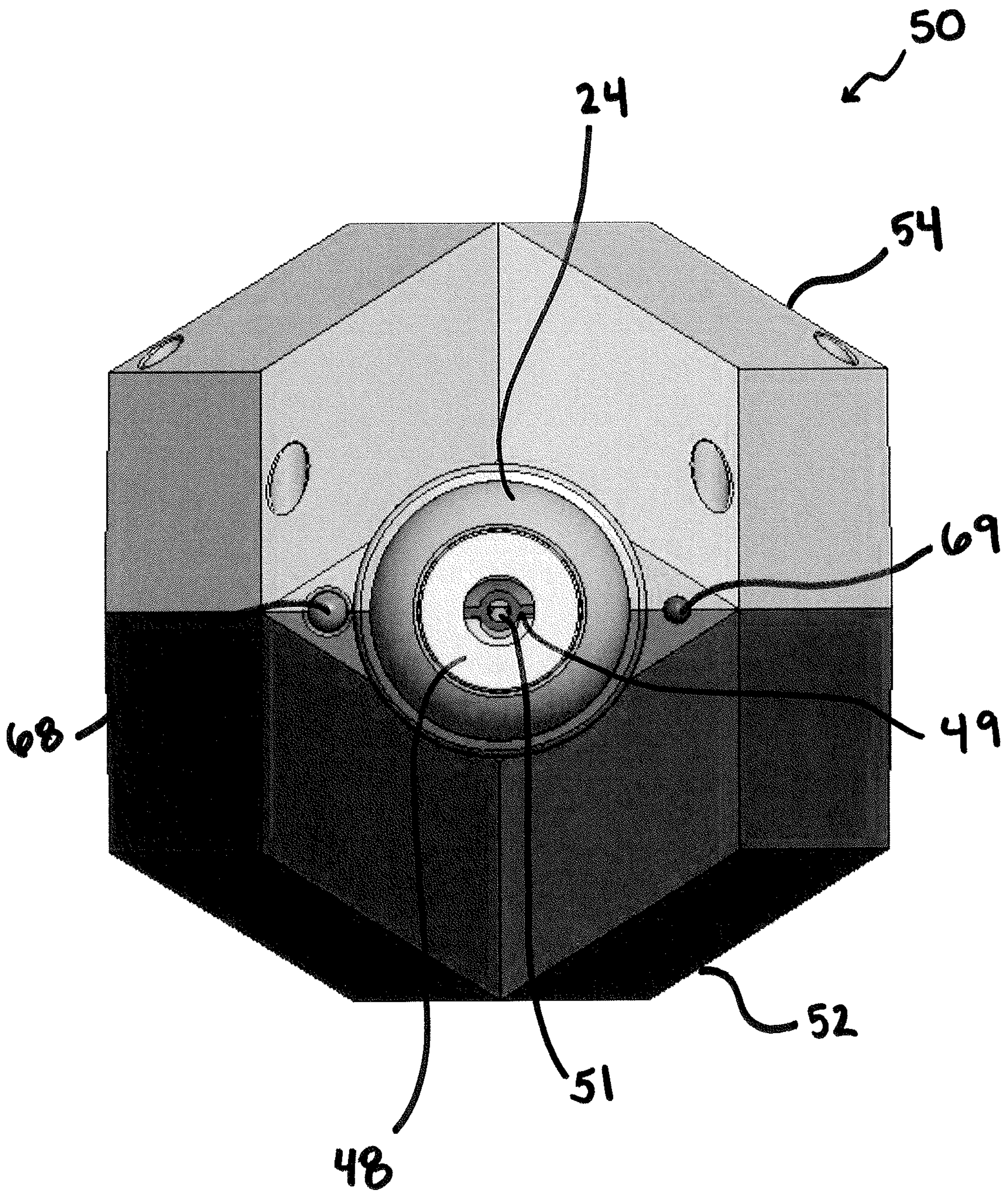
FIG. 5 is a top view of the interactive device for collecting colors shown in FIG. 1.
Figure 6:
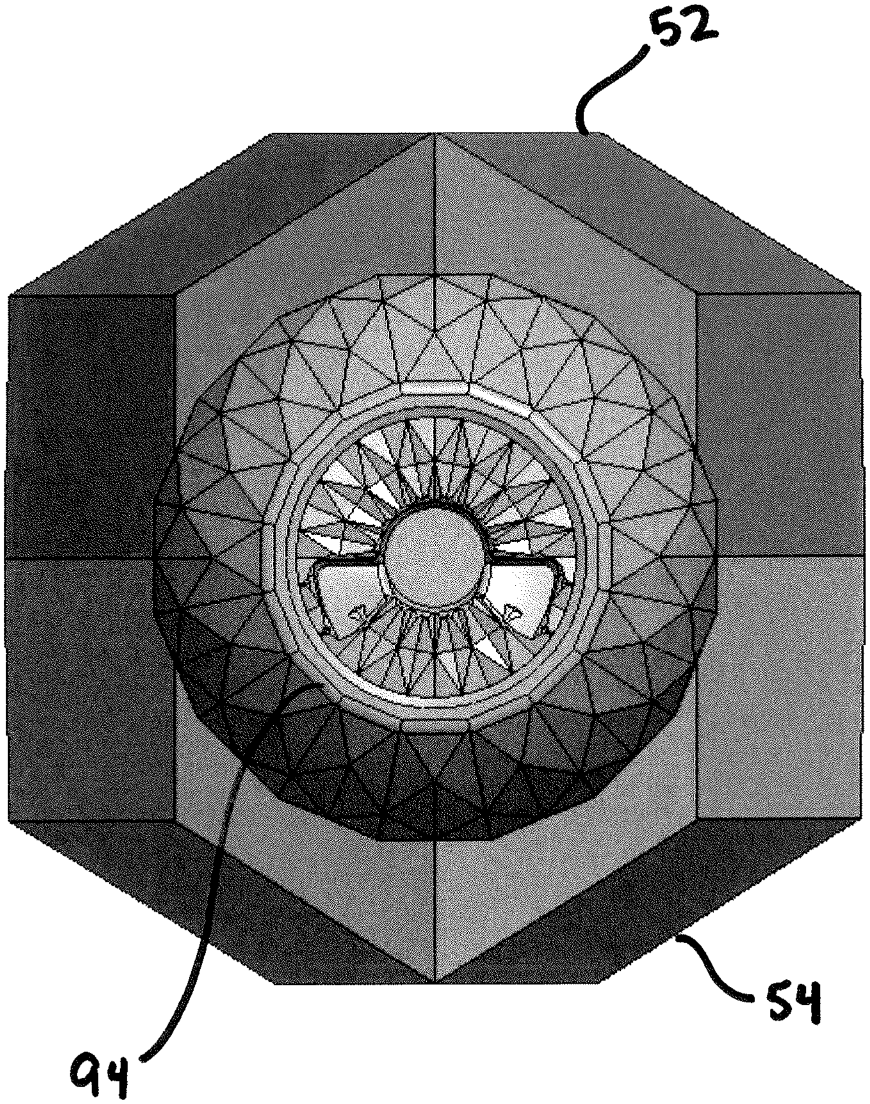
FIG. 6 is a bottom view of the interactive device for collecting colors shown in FIG. 1.
Figure 7:
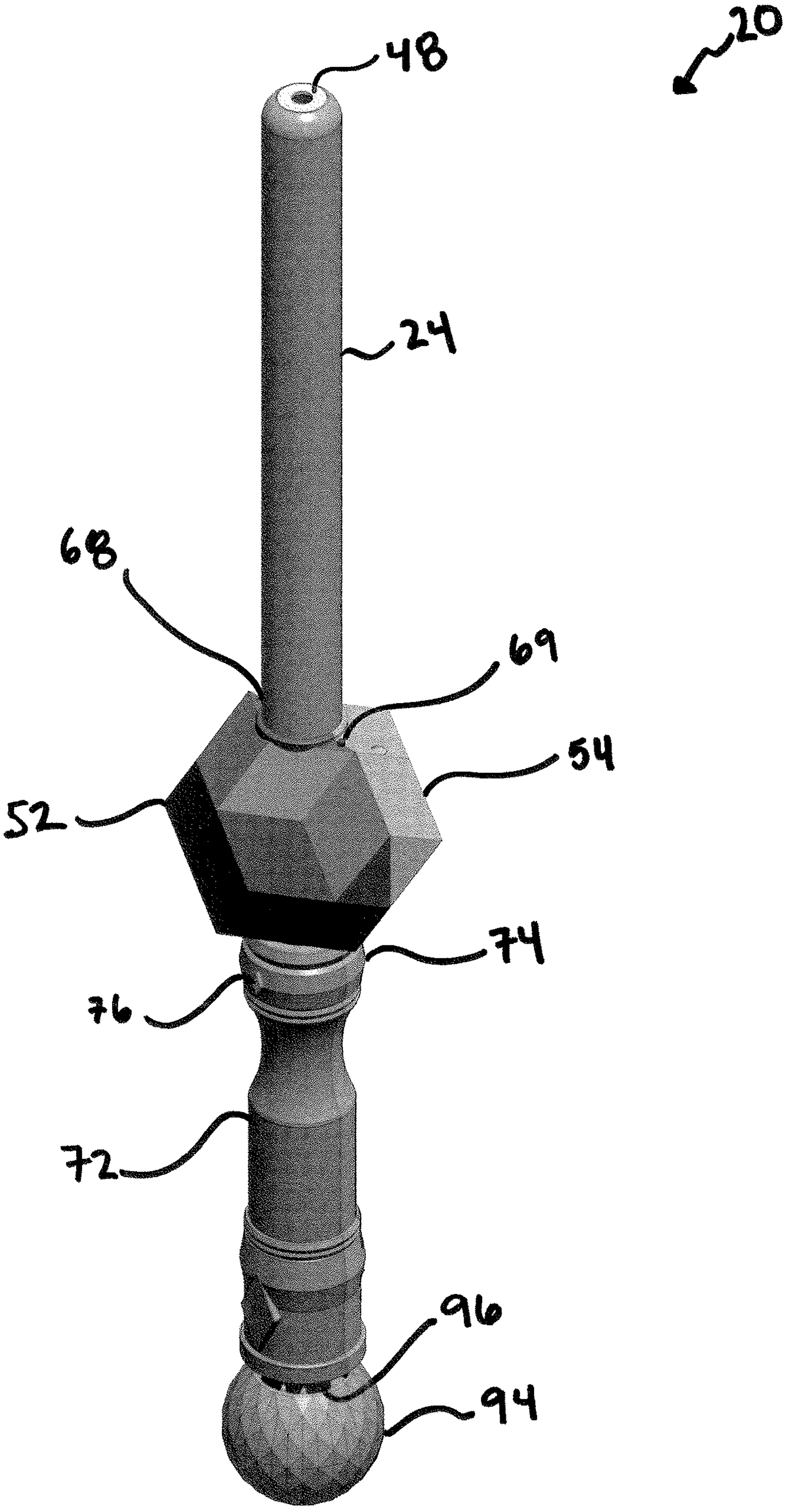
FIG. 7 is a top left perspective view of the interactive device for collecting colors shown in FIG. 1.
Figure 8:
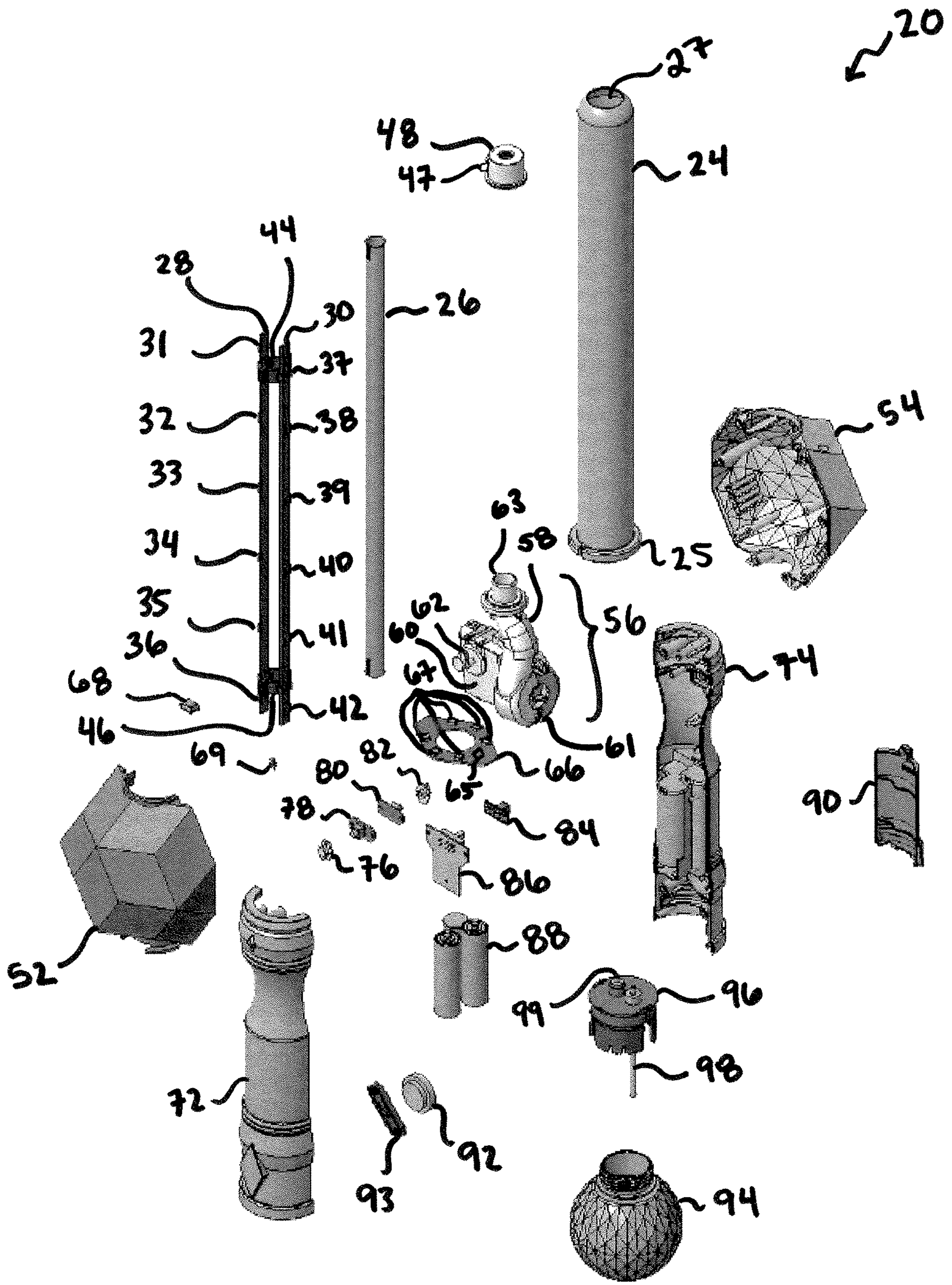
FIG. 8 is an exploded view of the interactive device for collecting colors shown in FIG. 1.
Figure 9:
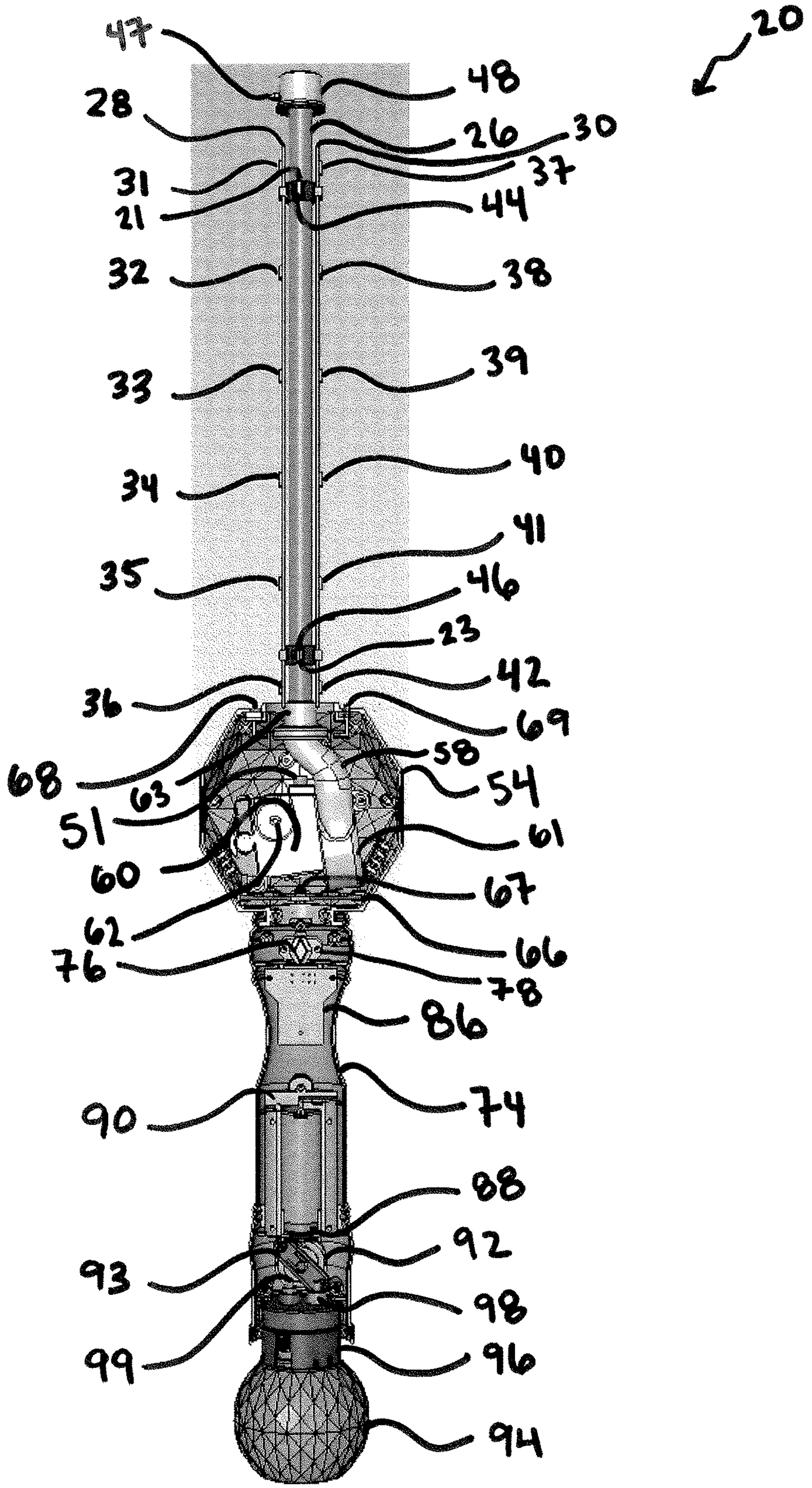
FIG. 9 is a front open faced view of the interactive device for collecting colors shown in FIG. 1.

As shown in FIGS. 1-4 and 6-9, the interactive device 20 includes a blade 22 that is connected to a housing 52, which housing is connected to a handle 70. A bubble solution container 94 is securable into the handle via a cover 96. As shown in FIGS. 1-5 and 7-9, the blade includes a tube 24, which is hollow and surrounds various internal elements. As shown in FIGS. 5 and 7-8, the tube includes an opening 27 in an upper surface into which a nozzle 48 secures. This tube protects these internal components, for instance, when dropped and prevents leakage of bubbles, if produced, onto the internal elements of the blade. This tube is made of plastic that does not break easily if dropped and is made of a material with a specific opacity to reflect light. The hollow tube also includes a reflective sheet surrounding its internal circumference to create a unique light effect when illuminated to further differentiate the illumination of each LED secured within the blade. This aids in definitively showing how many colors have been collected by the user in the gameplay. As shown in FIG. 8, the tube includes a lower shelf 25, which snug fits into an upper portion of the housing 50, for instance when the front cover 52 and back cover 54 of the housing are connected. As shown in FIGS. 8 and 9, secured within the tube is a pipe 26, which is hollow. Secured to an upper portion of this pipe is the nozzle, which includes a spout 47 secured within an edge thereof, to which a bubble solution channel 98 connects to transfer bubble solution into the nozzle. Secured within the nozzle is a wiper 49, which rotates 360 degrees around an inside circumference of the nozzle to create a film, see FIG. 5. The wiper rotates via a drive shaft 51, which is secured within the pipe and is connected to a motor 60, which is secured within the housing 50, see FIGS. 5 and 9. As shown in FIGS. 8 and 9, a first printed circuit board 28 ("PCB") and a second PCB 30 are secured vertically along the sides of the pipe via an upper and lower bracket (44, 46). As shown in FIG. 9, the upper and lower bracket snap fit around the outer circumference of the pipe and include hooks into which the first and second PCBs secure. The upper and lower bracket further include an upper and lower slot (21, 23) into which the solution channel secures along a side of the pipe through the length of the blade to the nozzle. As shown in FIGS. 8-9, the first and second PCBs each include multiple LEDs, which are customizable depending on user specification. For optimal gameplay while providing a clear delineation between each LED and row of LEDs within the blade, the number of LEDs on each printed circuit board is four to ten, preferably six. The first PCB includes six LEDs (31-36) and the second PCB includes six LEDs (37-42), which LEDs are electrically connected to the respective PCB's and soldered thereto. These LEDs extend throughout the length of the blade at a specific distance from one another on each PCB to ensure that the illumination of each LED is distinct and so that the colors of each LED do not blend into one another when illuminated. The LEDs on each printed circuit board are aligned in rows with one another or staggered throughout the length of the blade. Furthermore, it is advantageous that the blade is made of a specific material that clearly reflects the light from each LED so there is no confusion as to how many colors have been collected and where the user is within the gameplay. The first and second PCB are both electrically connected to a main PCB 66, which is secured within the housing. The LEDs that are secured to the first and second PCB are unique in that illuminate when in a toy mode, but they act as a user's scoreboard when a signal is received and when in interactive gameplay mode. In gameplay, each row of LEDs on the respective first and second PCB are programmed via an integrated circuit 65 ("IC"), which is part of the main PCB, to illuminate in a specific color when a unique signal is received. For example, when a signal is received by the device, the first LED on the first PCB and the first LED on the second PCB are both programmed to illuminate green when instructed. When a second signal is received, the second LEDs illuminate blue, when a third signal is received, the third LEDs illuminate yellow, when a fourth signal is received, the fourth LEDs illuminate white, when a fifth signal is received, the fifth LEDs illuminate purple and when a sixth signal is received, the sixth LEDs illuminate red. The device is also programmed via the IC to recognize when the corresponding number of LEDS within the blade, in this embodiment six rows, are all illuminated in the color to be collected in that gameplay. When this occurs, a unique effect or feature is activated within the device, such as bubble production, a unique light effect, and/or sound played via a speaker 92. This unique effect may also include the device unlocking another area within the gameplay. For example, one must collect all colors before being able to advance to the next level. Once the device recognizes that level of gameplay is achieved, it resets and is ready to begin collecting colors in the next level or area.

As shown in FIGS. 1-4 and 7-9, secured underneath the blade 22 is a housing 50. The housing is made of a front piece 52 and a back piece 54 that secure together and form an internal compartment. The housing is made of a plastic material that can withstand being dropped and is also made of a material that can transmit light from various LEDs 67 secured therein on the main PCB 66. Advantageously, the housing is a prismatic shape, so when the LEDs secured therein are activated, they reflect the light in a unique kaleidoscope pattern so that they mask the inner components of the housing as it is transparent. Further, when the LEDs are programmed to illuminate at different times, it creates a unique moving kaleidoscope pattern within the housing. As shown in FIGS. 1-5 and 7-9, an upper surface of the housing includes two openings into which a receiver 68 and a transmitter 69 are secured. The receiver and transmitter are for instance, infrared ("IR"), and are advantageously located in an upper surface of the housing so that the device receives and transmits signals regardless of the direction in which the blade is facing making the device omnidirectional. The receiver and transmitter are electrically connected to the main PCB 66, which is secured in the housing. As shown in FIGS. 8 and 9, the main PCB is preferably an LED PCB, which contains various LEDs around its circumference, which are soldered thereto. Moreover, electrically connected to and forming part of the main PCB is the IC 65, which is programmable to user specification depending on the type of collecting color gameplay desired. Advantageously, the PCBs secured to the main PCB are programmed via the IC to illuminate in the color in which the LEDS (31-42) in the blade are instructed to illuminate. Further, they are programmed to remain illuminated in the color of that gameplay that is collected. For example, if a user visits a green area of the gameplay and collects all colors within that gameplay, the one LED on the main PCB will remain illuminated in that color even when the device resets for the next level of gameplay. This aids in the user knowing which colors they have collected even when the device resets. Advantageously, all electrical components of the device are electrically connected to the main PCB via wiring, and the IC is programmed to activate and recognize the instructions needed for the activation for each component.

As shown in FIGS. 1-9 and 11-14, the interactive device 20 is a bubble sword, which in certain modes creates bubbles. Accordingly, secured within the housing 50 is a bubble cartridge 56, which contains an outer enclosure 57 made of plastic that is specifically molded in manufacturing to form an air duct 58 positioned adjacent to a fan 61 and further contains a motor 60, a pump 62 and various gears. The motor is electrically connected to the main PCB 66, so when instructed, the motor begins rotating the fan and the gears of the peristaltic pump. It also simultaneously rotates the drive shaft 51 via a worm gear to begin rotating the wiper 49 within the nozzle 48. When the motor is activated manually via a user or wirelessly via a signal received, the fan begins pushing air through the air duct, which is connected to the pipe via an outlet 63. The air is pushed upward through the length of the pipe 26 and into the nozzle. Simultaneously, bubble solution is pumped via a solution channel 98 from the bubble solution container 94 through the pump, along the length of the pipe and into the nozzle via the spout 47. The bubble solution drips at the precise rate in the nozzle due to the number of gears in the gearbox, so the nozzle is not overwhelmed and there is no leakage. The solution drips into the nozzle and forms a film via the rotation of the wiper so that air pushed from the fan propels the film into bubbles from the nozzle.

As shown in FIGS. 1-4 and 7-9, secured beneath the housing is a handle 70, which consists of a front casing 52 and a back casing 74, which secure together to form an internal compartment. As shown in FIGS. 8 and 9, a lower portion of the housing hooks into an upper portion of the handle when the handle is secured together. Secured within the handle and palpable through the front casing is a first push button 76, which is secured to a third PCB 78. Secured within the handle and palpable through the back casing is a second push button 82, which is secured to a fourth PCB. Further secured within the handle is a slide switch 84, which is palpable through the back casing and is secured to a fifth PCB 86. The third, fourth, and fifth PCBs are electrically connected to the main PCB 66. The back casing of the handle also includes a battery compartment, which houses batteries 88, which power the device. The batteries are electrically connected to the slide switch, which is preferably a three-way slide switch, so that when the slide switch is pushed to the right or the left, different modes of the device, for instance toy mode or interactive mode, are activated via the programming of the IC 65 on the main PCB. The batteries are easily replaceable via a battery compartment door 90, which screws not the back casing of the handle. Further secured within the handle is a speaker 92, which is secured within the housing via a speaker plate 93. The speaker is electrically connected to the main PCB and is programmed to activate manually and/or wirelessly via the IC.

As shown in FIGS. 1-4 and 6-9, a bubble solution container 94 is secured beneath the handle 70 via a cover 96. Advantageously, the cover includes grooves, which twist into a lower portion of the handle making the container easily removeable for the replenishment of bubble solution when needed. As shown in FIGS. 8-9, the cover includes two openings into which a bubble solution channel 98 and a recirculation channel snug fit. The bubble solution channel draws bubble solution from the reservoir through the handle, housing and blade of the sword and eventually create bubbles from the nozzle 48. The recirculation channel drains excess solution from the nozzle through the blade 22, housing 50 and handle for eventual reuse in the bubble solution container.

The interactive device 20 is advantageously programmed in unique ways depending on user specification for the color collecting gameplay. As shown in FIGS. 1-4 and 7-9, the device includes a front and a back push button (76, 82) and a slide switch 84. The slide switch is electrically connected to the batteries 88 and is preferably a three-way slide switch. When this switch is in the middle position, all features and effects of the device are turned off. When the slide switch is in the left position, the device is in a first mode, wherein the device acts as a toy, which in this embodiment is a bubble sword. For example, when the slide switch is in the left position, the IC 65 of the main PCB 66 automatically instructs activation of the motor 60 within the bubble cartridge 56 so bubbles are produced from the nozzle 48. The LEDs 67 located on the main PCB are activated and illuminate the housing 50 in a unique pattern along with the six LEDs (31-42) on both first and second PCB (28, 30). When the slide switch is in the left position, the main PCB is programmed so that only the front push button is activatable and is programmed to cycle through a variety of light and bubble sequences depending on the number of times that a user presses the button. These light sequences are programmed so that the LEDs located throughout the sword vary in color, luminosity, intensity and/or timing. The LEDs for example, illuminate in a sequence or pattern vertically on the blade to create a unique light effect. The use of a first and second push button and a slide switch is advantageous as the sword is not only a toy that a user can enjoy in an amusement park or at home, but it also acts as a scorecard while in interactive mode.

When the slide switch 84 is in the right position, the device 20 enters interactive mode and is ready to participate in gameplay. While in interactive mode, the receiver 68 and the transmitter 69 are activated and ready to send and receive signals from other devices and/or a fixture. More specifically, the back push button 82 is electrically connected to the transmitter so when a user presses the back push button a signal is transmitted. This device is programmed to send a signal to another device, toy and/or a fixture within a proximity of the device. When the device is in interactive mode, it is active within the gameplay and acts as a scoreboard and a digital passport to track the number of colors collected along with unlocking unique features within the amusement park. This gameplay should not be construed as being limited to an amusement park as it can be used in any arena so long as the required other interactive gameplay devices and/or fixtures are present. The device visibly acts as a scoreboard by illuminating the LEDS (31-42) that are present on the first and second PCBs (28, 30) located within the blade 22 of the device and illuminating the LEDs 67 which are on the main PCB 66. The device is programmable in a variety of ways depending on the style of gameplay. These methods of illuminating the LEDs within the blade to collect colors within an interactive gameplay are not to be construed as limiting. The various control circuitry throughout the sword is programmable depending on user specification, i.e., the sequential order, the color of LEDs, the number of LEDs illumination simultaneously and/or within each row, the surprise visual effects when all colors have been collected, and/or the number of LEDs present within the blade. One method, as shown in FIGS. 11-12 includes gameplay between one or more interactive devices 20-20*c*.

This method includes programming the interactive device to utilize one unique IR code to collect all the colors within the blade. In this embodiment, the IC 65 is programmed to illuminate the LEDs on the first and second printed circuit boards in a unique sequence each time the device receives that one IR signal. For example, the LEDs within the blade are programmed to illuminate in a specific color pattern in a specific sequence in order from bottom to top or top to bottom. Each time the receiver receives that one IR code, it unlocks a sequential row of LEDs in the blade to illuminate in a unique color. For example, when the receiver receives the one IR code, the sword is programmed to illuminate the first row of LEDS on the first and second printed circuit board in a specific color. When the sword receives that same IR code, it unlocks the illumination of the second row of LEDS on the first and second printed circuit board. The levels of LEDs on the first and second PCBs continue to illuminate in sequential order and in the distinct programmed color with each unique IR code received. Advantageously, the main PCB, which includes various LEDS is programmed to illuminate all or some of the LEDs and remain illuminated in the same color in which the user just collected until the next color is collected. This aids the user in monitoring the area of the gameplay that they just encountered and steers them toward the next color that must be collected. As shown in FIG. 8, the main PCB includes 6 LEDs, which illumination in color aligns with the order and illumination of the LEDS on the first and second PCB. Further, when illuminated in sequential order from the first row to the sixth row, the illumination of a color begins at the sixth row and cascades down each row in the color that the first row is collecting. When an additional signal is received for the next color, the illumination of the next color begins at the sixth row and cascades down each row in the color that the second row is collecting. This unique pattern continues until the sword has received the IR code six times, the specific number of times in this embodiment. Once the sword receives the unique IR code six times, all the LEDs on the blade illuminate in a unique pattern signifying to the user that it has achieved that level of gameplay. Further, the device is programmable so that with the one IR code, a different sequence of the LEDs on the first and second PCBs may illuminate. It need not be sequential and is programmable to be random in the order in which the LEDs illuminate on the blade. In addition to illumination, when the device receives each one IR signal, bubbles are produced from the nozzle 48, a sound is played through the speaker 92.

If the interactive gameplay includes collecting all colors within a specific area of a park, then the one IR code is associated with the activation of all the LEDS (31-42) within the blade 22 in the color associated with that area of gameplay. Accordingly, the LEDS in the blade are all programmed to illuminate in the same color that is specific to that area within the gameplay. For example, the user must receive the IR signal from other player(s) or a fixture 100 six times before collecting all colors within that gameplay. Advantageously, once collected, the device unlocks the next level of gameplay by unlocking a unique digital passport code. One the device has collected all colors, a special programmed feature occurs, which includes a combination lights, sound, and/or bubbles and for a specific predetermined time before the device resets so a user can begin the same or different color collecting experience. In the interactive mode, the user of the device also sends signals to others in the interactive game play to collect colors by pushing the back push button 82, which sends an IR signal via the transmitter 69.

As shown in FIGS. 14-15, another method of programming the device 20 to collect colors within the blade 22 includes programming the IC 65 to recognize and identify multiple IR codes that are unique to the illumination and color of specific LEDs on the blade. For example, the first LEDs (36, 42) on the first and second printed board (28, 30) are programmed with a first unique IR code specific to its illumination of blue when that unique first signal is received, the second LEDs (37, 41) are programmed with a second unique IR code specific to its illumination of green when that unique second signal is received, etc. for the remaining LEDs within the blade. Each unique signal is recognized and read by the IC on the main PCB 66 and instructs the unlocking of the illumination of the specific LED(s) in the specific color to which the unique IR code relates. This illumination need not be in sequential order and for instance, is sent from the fixture 100 or another device 20*a* within a specific area of an amusement park. For example, this unique signal is programmed into different fixtures in different areas within the gameplay. Accordingly, when a user comes into proximity of that fixture, the unique signal is automatically sent to the device to illuminate the LED in a color specific to that unique code and areas of gameplay. Another method includes the device recognizing which color needs to be collected next in the gameplay and sending a unique signal specific to the unique code to the fixture. For example, the IC is programmed to recognize which color must be collected next in the gameplay or what color the user is missing and sends a unique signal to the nearby fixture specific to that the color that must be collected. This signal may automatically be sent via proximity detection or is sent via the user pressing the back push button 82, which transmits the unique signal via the transmitter 69. The fixture is programmed via its own integrated chip to recognize the signal and associate it with the illumination of the fixture in the color associated with the unique signal. In addition to illuminating in the required color, the fixture is programmed to automatically send the same unique signal back to the fixture, which is received by the receiver 68. This signal is read via the IC and instructs illumination of one or multiple LEDs within the blade to illuminate in the color associated with the unique signal. Further, one or more of the LEDs 67 on the main PCB 66 also illuminate in the color associated with the unique code.

More specifically, in the embodiment using the interactive device shown in FIGS. 1-9, the blade 22 includes a first and second printed circuit board (28, 30), each with six LEDs (31-42), which are aligned in rows throughout the length of the blade. Accordingly, the IC 65 is programmed to recognize and associate six unique IR code with six unique colors, which will ultimately illuminate each of the six rows in the unique colors. When the sword comes into a proximity of the fixture 100, the user pushes the back push button and depending on where the user is within the game play and what color they need to collect dictates the unique IR code that is sent via the transmitter 69 to the fixture. In this embodiment, the user is the arbiter of its own gameplay and need not wait to receive an IR signal from a third party. When the unique IR signal is sent to the fixture, the unique signal unlocks a feature or effect within the fixture that is unique to that IR code and illuminates the fixture in the color associated with that unique IR signal. Simultaneously, the fixture sends the same unique signal back to the sword to unlock a color within the sword specific to that unique signal. For example, the first LEDs (36, 42) are coded with a first IR signal that unlocks illumination of the first LEDs in blue, the second LEDs (35, 41) are coded with a second IR signal that unlocks illumination of the second LEDs in green, the third LEDs (34, 40) are coded with a third IR signal that unlocks illumination of the third LEDs in yellow, the fourth LEDs (33, 39) are coded with a fourth IR signal that unlocks illumination of the fourth LEDs in purple, the fifth LEDs (32, 38) are coded with a fifth IR signal that unlocks illumination of the fifth LEDs in red, and the sixth LEDs (31, 37) are coded with a sixth IR signal that unlocks illumination of the sixth LEDs in pink. If the color that needs to be collected is red, the IC is programmed to recognize that color needs to be collected and transmits only the IR signal relative to the code. The fixture is programmed to recognize that unique IR code and will illuminate red. Simultaneously, the fixture sends the same unique IR signal back to the device and instructs illumination of the first row of LEDs within the blade in red. Once all the colors are collected, a unique visual effect is created by the sword, or within a nearby fixture and/or the sword unlocks a unique VIP area within the park. These features include, for example, production of fog, illumination, bubbles, sound, and/or projection.

It is well recognized by persons skilled in the art that alternative embodiments to those disclosed herein, which are foreseeable alternatives, are also covered by this disclosure. The foregoing disclosure is not intended to be construed to limit the embodiments or otherwise to exclude such other embodiments, adaptations, variations, modifications and equivalent arrangements.

The invention claimed is:

1. A method of collecting colors on an interactive device comprising:
- programming an integrated circuit secured within the interactive device to associate a unique code with a color;
- transmitting a unique signal associated with the unique code to a fixture;
- recognizing the unique signal within fixture, thereby illuminating the fixture in the color associated with the unique code and triggering the transmission of the unique signal from the fixture to the device; and
- recognizing the unique signal via the integrated circuit of the device, thereby illuminating at least one LED secured within the device in the color associated with the unique signal.

2. The method of claim 1, further comprising continuously illuminating the LED in the color once activated.

3. The method of claim 1, further comprising triggering an effect from the fixture when the unique signal is recognized.

4. The method of claim 3, wherein the effect is selected from the group consisting of production of fog, illumination, production of bubbles, sound, and projection.

5. The method of claim 1, wherein each of the at least one LED is illuminated in a different color dependent on the unique signal received.

6. The method of claim 1, further comprising invoking a feature from the device when the unique signal is recognized.

7. The method of claim 1, further comprising programming the integrated circuit to associate additional unique codes with additional colors and transmitting additional unique signals associated with the additional unique codes to the fixture.

8. The method of claim 1, further comprising automatically resetting the device once a number of unique signals has been received.

9. The method of claim 1, further comprising triggering a special effect from the device once a number of unique signals have been received.

10. An interactive device for collecting colors comprising:
- a housing with a first and second end, wherein the housing comprises a receiver and a transmitter electrically connected to a main printed circuit board with an integrated circuit, wherein the integrated circuit is configured to recognize at least one unique code, wherein the at least one unique code is associated with a color;
- a blade connected to the second end of the housing, wherein the blade comprises a first printed circuit board comprising at least one LED, wherein the at least one LED illuminates in the color associated with the at least one unique code;
- a handle secured to the first end of the housing and containing a button, which is configured to transmit a unique signal associated with the at least one unique code to a nearby device via the transmitter.

11. The interactive device for collecting colors of claim 10, wherein a number of the at least one LED is four to ten, preferably six.

12. The interactive device for collecting colors of claim 10, wherein the main printed circuit board comprises at least one LED, wherein the at least one LED illuminates in the color associated with the at least one unique code.

13. The interactive device for collecting colors of claim 10, wherein the integrated circuit is configured to identify when a number of the at least one LEDs are illuminated thereby unlocking a unique feature within the device.

14. The interactive device of claim 11, wherein the wherein the number of at least one LED are secured throughout the length of the blade and are configured to illuminate in sequential order from one end of the blade to the other end.

15. The interactive device of claim 10, further comprising a second printed circuit board and secured within the blade, wherein the second circuit board comprises at least one LED.

16. The interactive device for collecting colors of claim 15, wherein the at least one LED of the first and second printed circuit boards are positioned in a row within the blade.

17. An interactive system for collecting colors comprising:
- an interactive device comprising:
  - a housing comprising a receiver and a transmitter electrically connected to a main printed circuit board with an integrated circuit; and
  - a first printed circuit board comprising six light emitting diodes and electrically connected to the main printed circuit board;
  - wherein the integrated circuit is configured to recognize six unique codes and transmit six unique signals associated with each of the six unique codes;
  - wherein each of the six unique codes is associated with a unique color; and
- a fixture comprising a second receiver and a second transmitter electrically connected to a second main printed circuit board with a second integrated circuit, wherein the second integrated circuit is configured to recognize each of the six unique codes and illuminate the fixture in the color associated with the received unique signal and automatically transmit the received unique signal back to the device;

wherein one of the six light emitting diodes illuminates in the color associated with the unique signal when received by the device.

18. The interactive system of claim 17, wherein the six light emitting diodes are programmed to illuminate in a sequence.

19. The interactive system of claim 17, wherein a special effect is activated from the device when all six unique signals have been received.

20. The interactive system of claim 17, wherein each of the six LEDs are continuously illuminated in the color once activated by the respective unique signal.

* * * * *